US011212861B2

(12) United States Patent
Jayavarapu et al.

(10) Patent No.: US 11,212,861 B2
(45) Date of Patent: Dec. 28, 2021

(54) APPARATUS AND METHODS FOR REDUCING POWER USAGE IN USER EQUIPMENTS

(71) Applicant: QUALCOMM Incorporated, San Diego, CA (US)

(72) Inventors: Venkata Krishna Murthy Jayavarapu, Hyderabad (IN); Naga Chandan Babu Gudivada, Hyderabad (IN); Phaneendra Cheekatla, Hyderabad (IN); Alok Dhal, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 16/452,467

(22) Filed: Jun. 25, 2019

(65) Prior Publication Data
US 2020/0329520 A1  Oct. 15, 2020

(30) Foreign Application Priority Data

Apr. 10, 2019 (IN) .............................. 201941014418

(51) Int. Cl.
*H04W 76/18* (2018.01)
*H04W 24/08* (2009.01)
*H04W 88/06* (2009.01)

(52) U.S. Cl.
CPC .......... *H04W 76/18* (2018.02); *H04W 24/08* (2013.01); *H04W 88/06* (2013.01)

(58) Field of Classification Search
CPC combination set(s) only.
See application file for complete search history.

(56) References Cited

U.S. PATENT DOCUMENTS

2016/0359699 A1* 12/2016 Gandham ............. G06F 21/552
2017/0142742 A1*  5/2017 Fischer ................. H04W 16/14
(Continued)

FOREIGN PATENT DOCUMENTS

EP    1422963 A1   5/2004
GB    2540857 A    2/2017

OTHER PUBLICATIONS

International Search Report and Written Opinion—PCT/US2020/027832—ISA/EPO—dated Jul. 6, 2020.

*Primary Examiner* — Xavier S Wong
(74) *Attorney, Agent, or Firm* — QUALCOMM Incorporated

(57) ABSTRACT

Aspects of the present disclosure provide techniques and apparatus for wireless communication. In one aspect, a method is provided which may be performed by a wireless device such as a user equipment (UE) that may support a first radio access technology (RAT) and a second RAT. The method generally includes: attempting to communicate with a base station (BS) of the first RAT; in response to an event, stopping the attempt to communicate with the BS of the first RAT; in response to stopping the attempt to communicate with the BS of the first RAT, attempting to connect to the second RAT; and in response to a successful connection to the second RAT: identifying a first value of a parameter associated with the event; comparing the value to a second value; and determining whether to perform an action associated with the first RAT based at least in part on the comparing.

30 Claims, 7 Drawing Sheets

(56) References Cited

U.S. PATENT DOCUMENTS

| | | | |
|---|---|---|---|
| 2017/0339629 A1* | 11/2017 | Lindoff | H04W 48/16 |
| 2018/0234916 A1* | 8/2018 | Song | H04W 48/18 |
| 2018/0270820 A1* | 9/2018 | Gupta | H04W 64/003 |
| 2019/0081959 A1* | 3/2019 | Yadav | H04L 43/04 |
| 2019/0090181 A1* | 3/2019 | Iyer | H04W 24/08 |
| 2020/0068354 A1* | 2/2020 | Stapleford | H04W 4/20 |

* cited by examiner

APPARATUS AND METHODS FOR REDUCING POWER USAGE IN USER EQUIPMENTS

CROSS REFERENCE TO RELATED APPLICATIONS

This application for patent claims priority to Indian provisional application number 201941014418, filed Apr. 10, 2019, which is hereby incorporated by reference in its entirety.

TECHNICAL FIELD

The present disclosure relates generally to wireless communications, and more particularly, to apparatus and methods for reducing power usage in user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in LTE or 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, computer-readable media, and apparatuses are provided. The apparatuses may be user equipment (UE) or a base station. Certain aspects of the present disclosure provide a method for wireless communication, performed by a wireless device, such as a user equipment (UE). The UE may support a first type of radio access technology (RAT) and a second type of RAT. The method generally includes: attempting to communicate with a base station (BS) of the first RAT; in response to an event, stopping the attempt to communicate with the BS of the first RAT; in response to stopping the attempt to communicate with the BS of the first RAT, attempting to connect to the second RAT; and in response to a successful connection to the second RAT: identifying a first value of a parameter associated with the event; comparing the first value to a second value; and determining whether to perform an action associated with the first RAT based at least in part on the comparing.

Certain aspects of the present disclosure provide an apparatus for wireless communication. The apparatus may support a first type of radio access technology (RAT) and a second type of RAT. The apparatus generally includes at least one processor, memory coupled with the at least one processor, the memory comprising instructions executable by the at least one processor to cause the apparatus to: attempt to communicate with a base station (BS) of the first RAT; in response to an event, stop the attempt to communicate with the BS of the first RAT; in response to stopping the attempt to communicate with the BS of the first RAT, attempt to connect to the second RAT; and in response to a successful connection to the second RAT: identify a first value of a parameter associated with the event; compare first the value to a second value; and determine whether to perform an action associated with the first RAT based at least in part on the comparison.

Certain aspects of the present disclosure provide for an apparatus for wireless communication. The apparatus may support a first type of radio access technology (RAT) and a second type of RAT. The apparatus generally includes: means for attempting to communicate with a base station (BS) of the first RAT; means for, in response to an event, stopping the attempt to communicate with the BS of the first RAT; means for, in response to stopping the attempt to communicate with the BS of the first RAT, attempting to connect to the second RAT; and means for, in response to a successful connection to the second RAT: identifying a first value of a parameter associated with the event; comparing the first value to a second value; and determining whether to perform an action associated with the first RAT based at least in part on the comparing.

Certain aspects of the present disclosure provide for a computer-readable medium for wireless communication by a wireless device, such as a UE. The wireless device may support a first type of radio access technology (RAT) and a second type of RAT. The computer-readable medium generally includes code, which when executed by at least one processor, causes the wireless device to: attempt to communicate with a base station (BS) of the first RAT; in response to an event, stop the attempt to communicate with the BS of the first RAT; in response to stopping the attempt to communicate with the BS of the first RAT, attempt to connect to the second RAT; and in response to a successful connection to the second RAT: identify a first value of a parameter associated with the event; compare the first value to a second value; and determine whether to perform an action associated with the first RAT based at least in part on the comparison.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
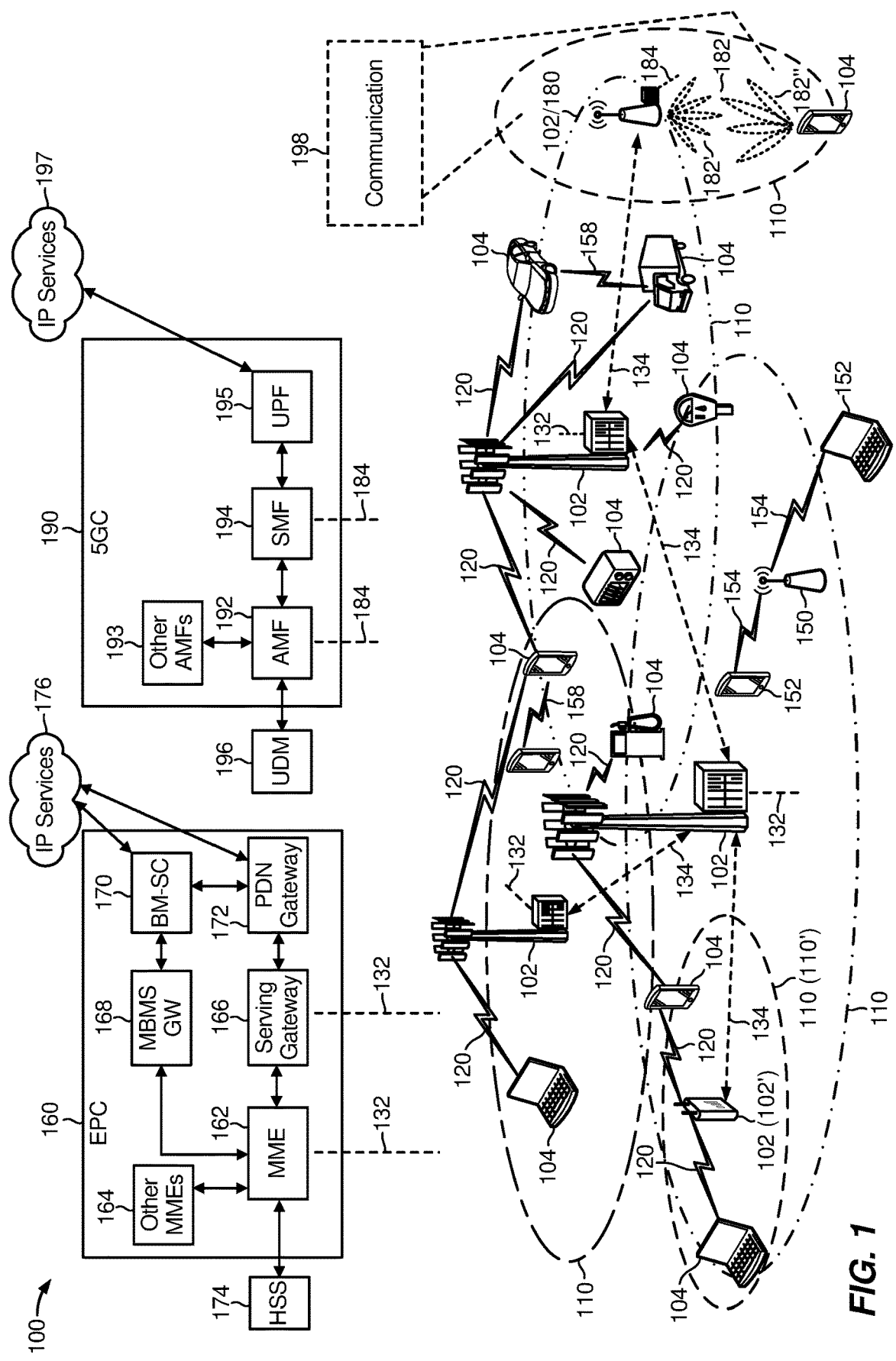
FIG. 1 is a diagram illustrating an example of a wireless communications system and an access network, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using hardware, software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells. The term "cell" can refer to, for example, a coverage area of a BS and/or a BS subsystem serving this coverage area, depending on the context in which the term is used. The term "channel" can refer to, for example, a channel in which information is carried, or the information carried on the channel, depending on the context in which the term is used.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a node, a network node, a network element, a device, a wireless device, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a netbook, a smartbook, a personal digital assistant (PDA), a robots/robotic device, a drone, industrial manufacturing equipment, a satellite radio, a navigation/positioning device (e.g., GNSS (global navigation satellite system) devices based on, for example, GPS (global positioning system), Beidou, GLONASS, or Galileo, a terrestrial-based device, etc.), a multimedia device, an entertainment device, a video device, a digital audio player (e.g., MP3 player), a camera, a gaming device, a tablet, a smart device, a wearable device (e.g., a smart watch, smart clothing, smart glasses, virtual reality goggles, a smart wristband, smart jewelry (e.g., a smart ring, a smart bracelet)), a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. Machine type communication (MTC) may refer to communication involving at least one remote device on at least one end of the communication and may include forms of data communication which involve one or more entities that do not necessarily need human interaction. MTC UEs may include UEs that are capable of MTC communications with, e.g., MTC servers and/or other MTC devices through Public Land Mobile Networks (PLMN), for example. Wireless devices may include Internet-of-Things (IoT) devices (e.g., narrowband IoT (NB-IoT) devices). IoT may refer to a network of physical objects, devices, or "things". IoT devices may be embedded with, for example, electronics, processing units, software, or sensors and may have network connectivity, which enable these devices to collect and exchange data. Some of the UEs 104 may be referred to as IoT devices (e.g., meters, gas pumps, toasters, robots, drones, vehicles, heart monitors, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure The UE 104 may also be referred to as a station, a mobile station, a subscriber station, a mobile unit, a subscriber unit, a wireless unit, a remote unit, a device, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may perform communication (198) with at least one base station (e.g., BS 102/180). Base station 102/180 may support and be part of both a first RAT and a second RAT and may be configured to send at least one signal associated with the communication 198. The communication 198 may be associated with action performed by the UE to: scan for the first RAT, connecting to BS 102/180 of the first RAT, or transitioning from the second RAT to the first RAT.

Figure 2:
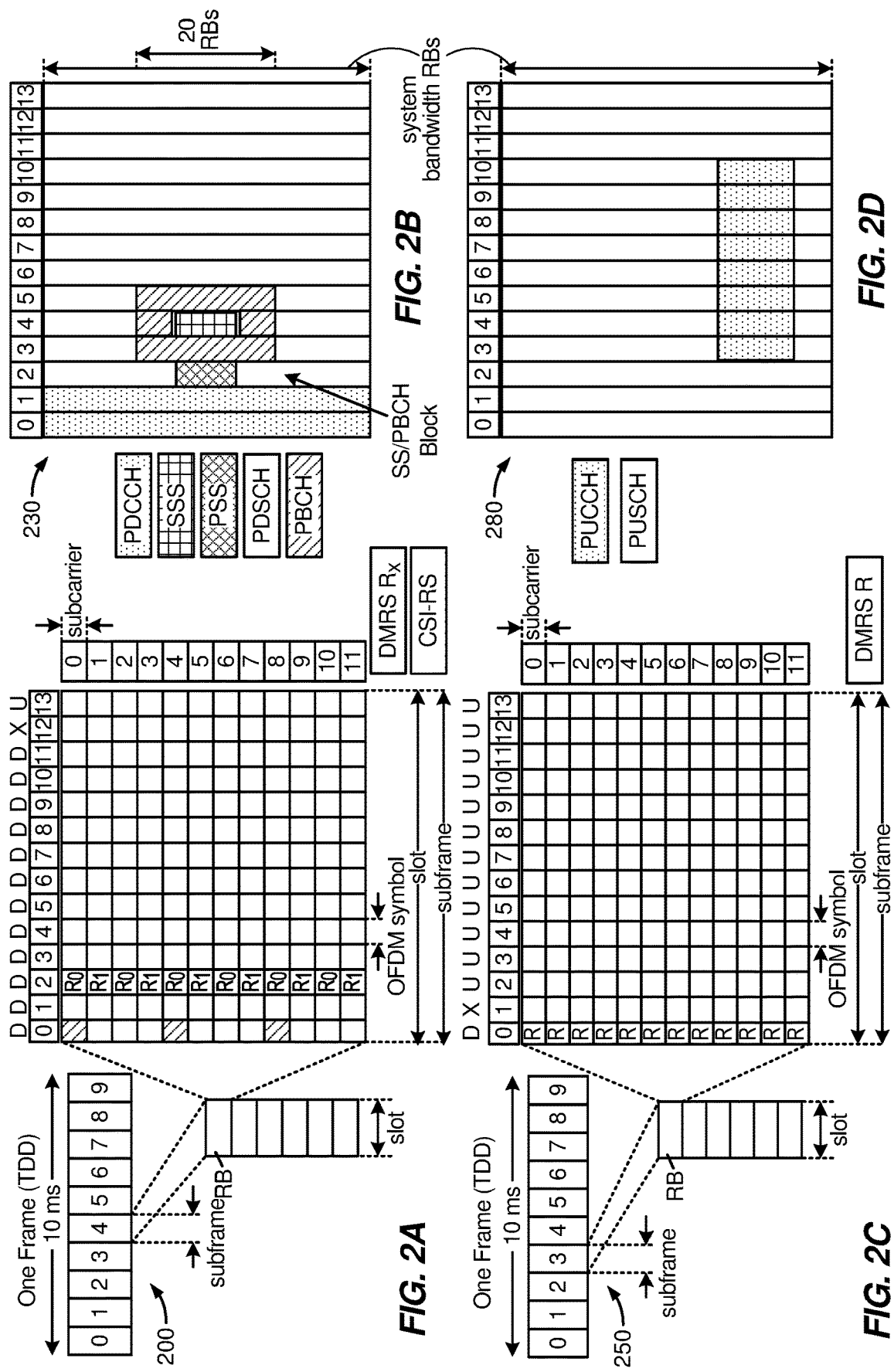
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with certain aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^{\mu*15}$ kKz, where μ is the numerology 0 to 5. As such, the numerology μ=0 has a subcarrier spacing of 15 kilohertz (kHz) and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as $R_x$ for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
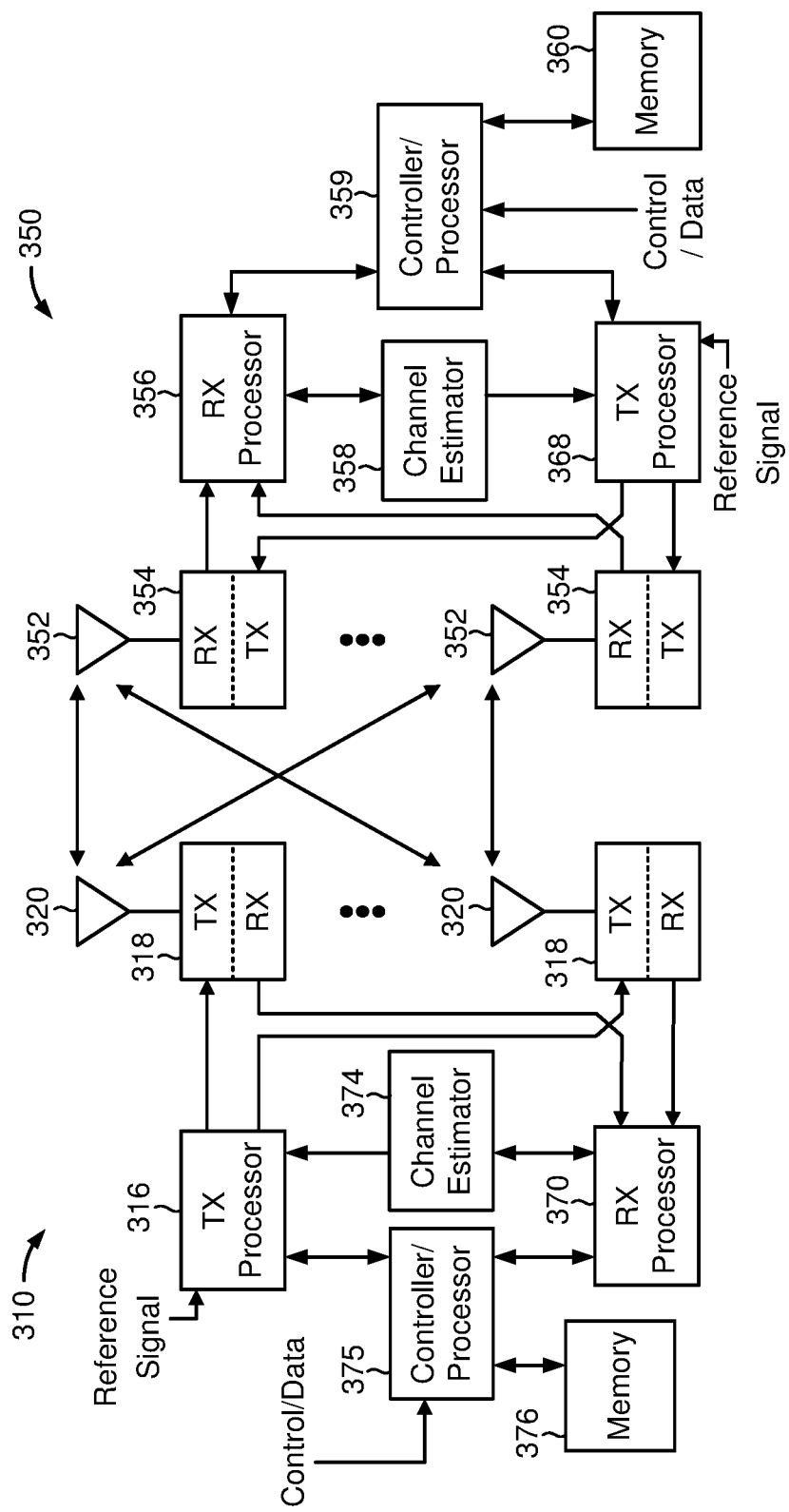
FIG. 3 is a diagram illustrating an example of a base station and user equipment (UE) in an access network, in accordance with certain aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing, or maybe used by controller/processor 359 to determine whether UE 350 is in coverage or remains in coverage of base station 310. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Controllers/processors and/or other components/modules/elements at UE 350 and may direct, coordinate, attempt or perform operations, flows, processes, and/or activities in connection with UE 350, for example, those illustrated in FIG. 6 and/or FIG. 7. Controllers/processors and/or other components/modules/elements at BS 310 and may direct, coordinate, attempt, or perform operations, flows, processes, and/or activities in connection with BS 310.

The focus of traditional RAT design (e.g., for non-MTC devices) is on the improvement of spectral efficiency, ubiquitous coverage, and enhanced quality of service (QoS) support. For example, current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 µs for regular UEs to 1 ms for MTC UEs. For example, LTE Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) provide support for various additional MTC enhancements, referred to herein as enhanced MTC (or eMTC). For example, eMTC may provide MTC UEs with coverage enhancements up to 15 dB.

Figure 4:
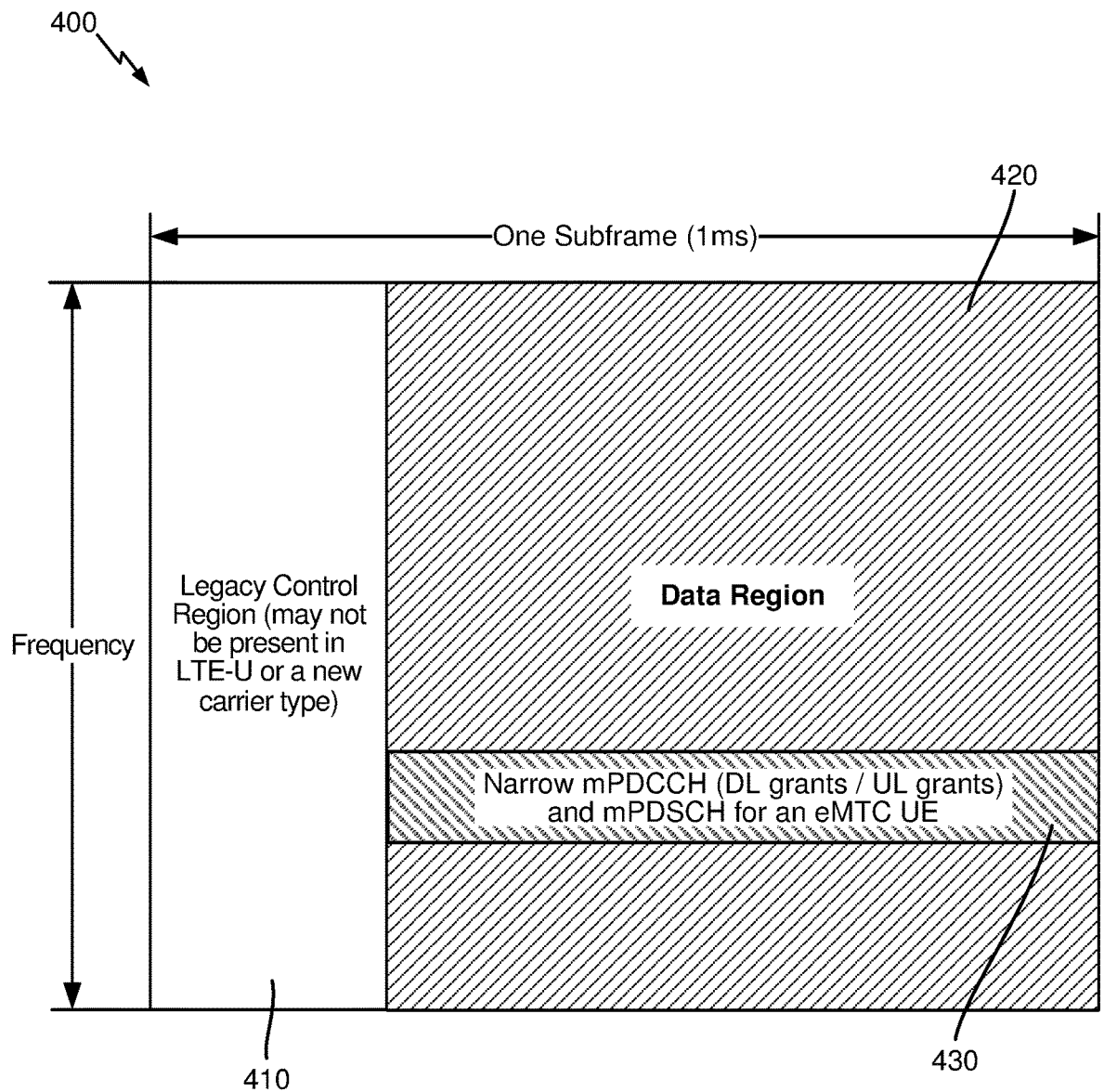
FIG. 4 illustrates an example subframe structure for eMTC, in accordance with certain aspects of the present disclosure.

As illustrated in the subframe structure 400 of FIG. 4, eMTC UEs can support narrowband operation while operating in a wider system bandwidth (e.g., 1.4/3/5/10/15/20

MHz). In the example illustrated in FIG. 4, a conventional legacy control region 410 may span system bandwidth of a first few symbols, while a narrowband region 430 of the system bandwidth (spanning a narrow portion of a data region 420) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

NB-IoT may refer to a narrowband (NB) radio technology specially designed for the IoT. NB-IoT may focus on indoor coverage, low cost, long battery life, and large number of devices. To reduce the complexity of UEs, NB-IoT may allow for narrowband deployments utilizing one PRB (e.g., 180 kHz+20 kHz guard band). NB-IoT deployments may utilize higher layer components of certain systems (e.g., LTE) and hardware to allow for reduced fragmentation and cross compatibility with, for example, NB-LTE/NB-IoT and/or eMTC.

Figure 5:
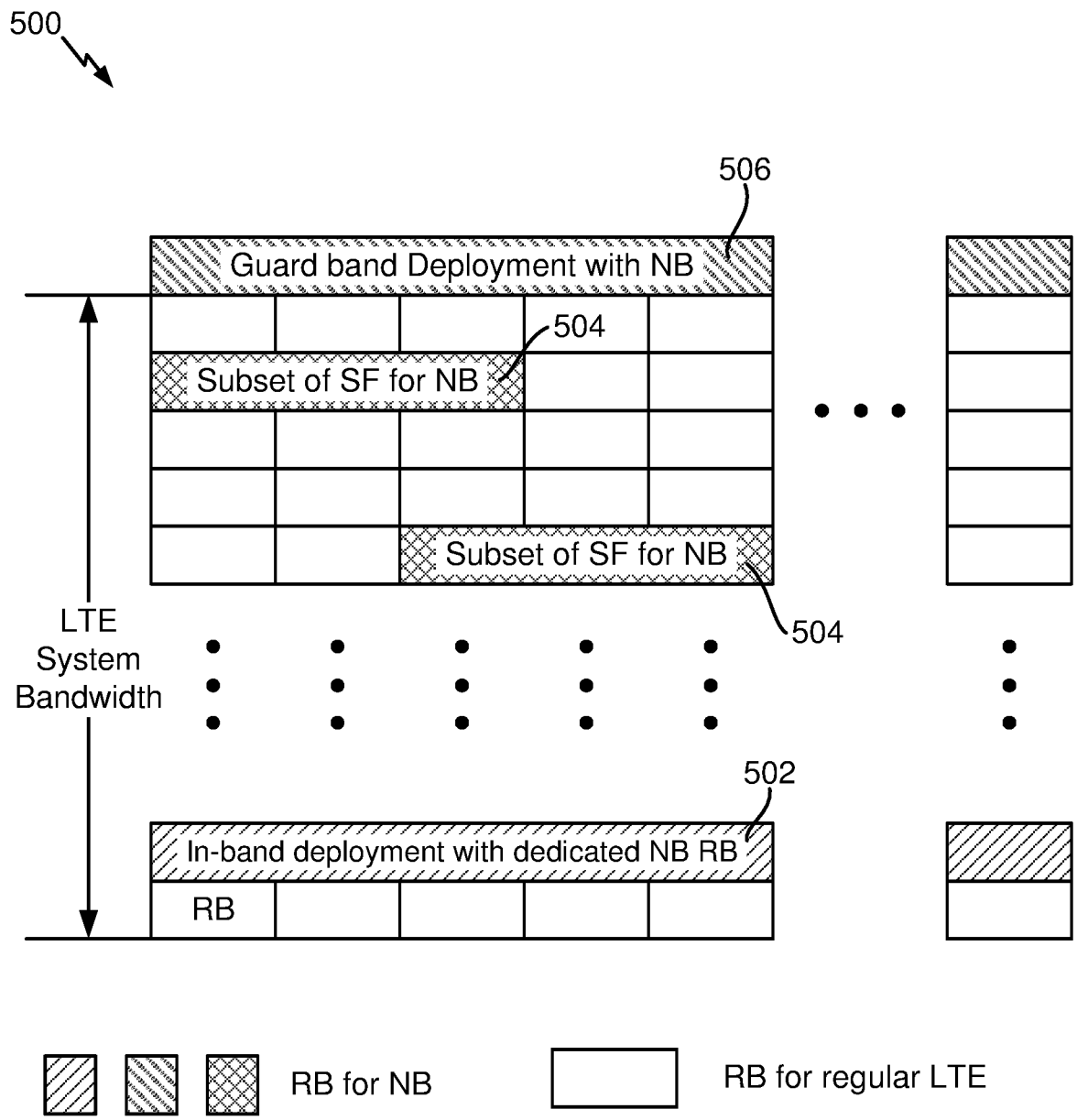
FIG. 5 illustrates an example deployment 500 of NB-IoT, in accordance with certain aspects of the present disclosure.

FIG. 5 illustrates an example deployment 500 of NB-IoT, according to certain aspects of the present disclosure. Three NB-IoT deployment configurations include in-band, guard-band, and standalone. For the in-band deployment configuration, NB-IoT may coexist with a system (e.g., GSM, WCDMA, LTE, and/or NR system(s)) deployed in the same frequency band. For example, the wideband LTE channel may be deployed in various bandwidths between 1.4 MHz to 20 MHz. As shown in FIG. 5, a dedicated RB 502 within that bandwidth may be available for use by NB-IoT and/or the RBs 504 may be dynamically allocated for NB-IoT. As shown in FIG. 5, in an in-band deployment, one RB, or 200 kHz, of a wideband channel (e.g., LTE) may be used for NB-IoT.

Certain systems (e.g., LTE, NR) may include unused portions of the radio spectrum between carriers to guard against interference between adjacent carriers. In some deployments, NB-IoT may be deployed in a guard band 506 of the wideband channel.

In other deployments, NB-IoT may be deployed stand-alone (not shown). In a standalone deployment, for example, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in non-narrowband systems (e.g., LTE), for example, from 10 ms to 40 ms. Based on the timing boundary, a UE is able to receive a PBCH transmission, which may be transmitted in subframe 0 of a radio frame.

NB-IoT may support deeper coverage than Cat M1. Operators are deploying both Cat M1 and NB-IoT technologies, or any two types of RATs where a second RAT provides deeper coverage support than a first RAT, to support mass deployment of IoT devices (smart cities/homes/factories, tracking devices, meters, etc.). To support the roll out, hybrid/multi-mode devices which can support more than one RAT, such as support for both Cat M1 and NB-IoT RATs are being designed and produced. NB-IoT or Cat M1 can connect many devices to the Internet of Things and make many new applications a reality. These technologies are optimized for applications that need to communicate small amounts of data over long periods of time. A selling point of low power wide area technologies like NB-IoT/Cat M1 may be the ability to communicate securely with longer coverage/penetration using low power. This places restrictions on power consumption of a device, and the device should use less power than a standard device, e.g., for its transmissions or receptions, during idle times, etc. As IoT devices may be required to work for years without changing or charging the battery, any requirement to recharge or change the battery may be implausible.

NB-IoT has deeper coverage (~20 dB) compared to Cat M1. In low coverage areas (e.g., in basement, indoors, dense urban areas), an IoT device can fall back to NB-IoT if it is losing Cat M1 coverage. Similarly for a device camped on NB-IoT, it may switch to Cat M1 if the service is lost.

Maximum coupling loss (MCL) may be an indicator of a RAT's capability for deep coverage, and greater MCL may indicate capability for deeper coverage. For example, NB-IoT may have higher MCL than Cat M1. Due to weather conditions (e.g., fog, rain, or extreme weather) or other reasons, there may be high possibilities of observing a loss or degradation of coverage, e.g., cellular coverage, which means IoT devices may not be able to camp on Cat M1, or may not be able to perform random access even if they are camped on a Cat M1 cell, e.g., a cell with a weak signal, whereas NB-IoT may be better in such condition of loss or degradation of coverage compared to Cat M1. The following issue may be observed when an IoT device switches to NB-IoT in the aforementioned case. The device may need to keep trying and scan Cat M1 signal continuously to camp. Even if Cat M1 coverage is improved, the device may continue to be in NB-IoT mode unless the device does periodic scans to detect that Cat M1 coverage improved. For example, a periodic Cat M1 scan can take approximately 2-3 minutes of time. If there is a loss or degradation of coverage due to, e.g., extreme weather condition or another condition, both Cat M1 and NB-IoT service levels may dip. If such conditions exist for, e.g., 24 hours and assuming the IoT device camped on NB-IoT is configured to wake up twice an hour and check for Cat M1, the device may spend more than 2 hours of total time (24 hours*2 wake ups per hour*3 minute per scan=144 minutes) to do the scan without success. Such unsuccessful scans lead to unnecessary power usage and reduces the battery life of the device. Therefore, there is an evident need to have an intelligent inter-RAT (IRAT) technique or algorithm to support switching from one RAT to another RAT, such as from NB-IoT to Cat M1, in hybrid/multi-mode UEs when a UE loses coverage or experiences a degradation of coverage, without expending too much power, as power is a key consideration for UEs, such as IoT UEs.

According to an aspect of the disclosure, a first RAT and a second RAT may be both available, wherein the second RAT supports deeper coverage than the first RAT, and a UE supporting both the first RAT and the second RAT is camped on the first RAT. For example, the first RAT may be Cat M1 and the second RAT may be NB-IoT. If the UE starts seeing a dip in service level of the first RAT and loses connection to the first RAT, it may relate the linkage between the first RAT and the second RAT (e.g., service level improvement/degradation of Cat M1 compared to NB-IoT). For example, lower layers may review the drop of service level relation and establish a relation quotient between the first RAT and the second RAT. Once the UE fully moves onto the second RAT, the UE may completely stop scanning for the first RAT until an improvement of coverage of, e.g., the second RAT, is identified by the UE or another device (e.g., another UE or a network node/element). The improvement may be gradual or rapid, depending on the cause of the drop in service level. Once an increase in the coverage of the second RAT compared to the conditions at which coverage of the first RAT is lost is identified, the UE may try to scan for a first RAT and camp on it. This technique may ensure that unnecessary periodic scans for the first RAT are avoided when the UE camps on the second RAT because of network loss of the first RAT, thereby reducing UE power usage and conserving UE battery power. This process may be enabled or disabled by a configurable parameter, such as a configurable file system value (e.g., elementary file system (EFS)), a user interface (UI) setting, or a non-volatile (NV) memory setting, etc., and may be ignored if the UE is not power focused (e.g., IoT UE connected to a power source).

Figure 6:
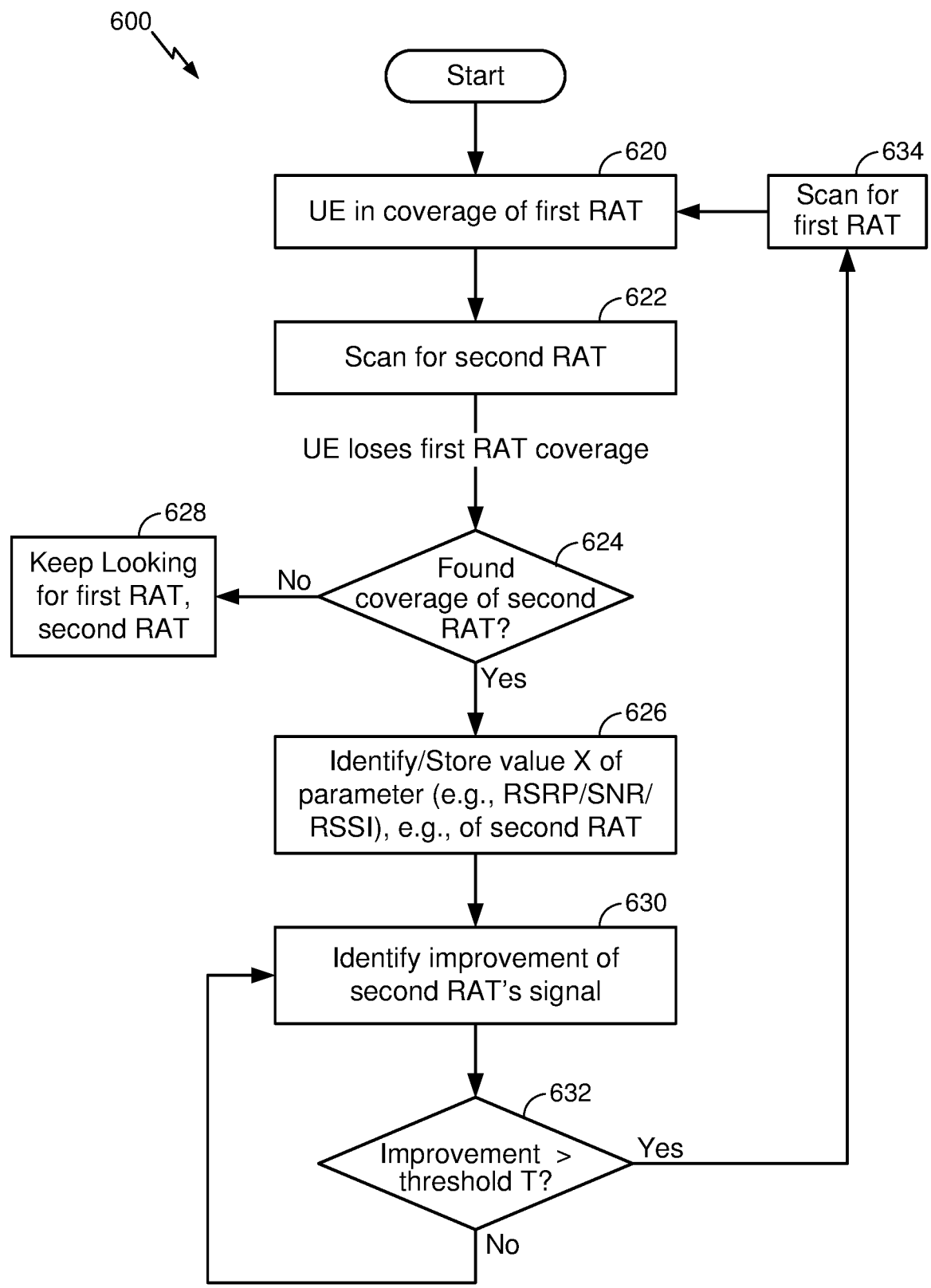
FIG. 6 is an example flow diagram, in accordance with certain aspects of the present disclosure.

FIG. 6 provides an example flow diagram 600, according to an aspect of the disclosure. The example of FIG. 6 includes a first RAT, a second RAT, and a UE supporting both the first RAT and the second RAT, wherein the second RAT supports deeper coverage than the first RAT, and a UE. For example, the first RAT may comprise Cat M1 and the second RAT may comprise NB-IoT. The UE may be, e.g., one of UE 104, 350. At 620, the UE may be in the coverage of the first RAT. The UE may already be camped on the first RAT and may attempt to communicate with a base station (BS) of the first RAT in connected mode, or the UE may determine that it is in coverage of the first RAT and attempt to communicate with a base station of the first RAT in order to connect to the base station and camp onto the first RAT. The base station of the first RAT may be. e.g., one of BS 102/180, or 310. Due to an event, the UE may lose coverage of the first RAT and/or determine that it is not in coverage of the first RAT. The event may comprise an indication that the base station of the first RAT is out of service (OOS) or in a congested state. For example, the OOS indication or the congested state indication may be based on detection of at least one of: a radio link failure (RLF), a physical layer out-of-sync, a failure of a random access channel (RACH) procedure, a maximum number of radio link control (RLC) retransmission attempts, an invalid radio resource control (RRC) configuration, a security failure, a handover failure, a failure to decode a system information block (SIB), a failed connection attempt, a timer expiration, or a drop in service level. In response to the event, the UE stop the attempt to communicate with the BS of the first RAT. UE components for performing activities associated with 620 may include antenna 352, receiver/transmitter 354, receiver processor 356, channel estimator 358, transmit processor 368, and/or controller/processor 359.

For example, in response to stopping the attempt to communicate with the BS of the first RAT, attempting to connect to the second RAT. Attempting to connect to the second RAT may include scanning for the second RAT (622) and entering a connected mode with the second RAT. UE components for performing activities associated with 622 may include antenna 352, receiver/transmitter 354, receiver processor 356, channel estimator 358, transmit processor 368, and/or controller/processor 359.

At 624, if coverage of the second RAT is determined to be found, the UE may connect to the second RAT successfully. In response to a successful connection to the second RAT, the UE may communicate with a base station of the second RAT, and may identify/store a value (e.g., referred to as "X" in the figure) of a parameter (626). The base station of the second RAT may be the same as the base station of the first RAT (e.g., a base station that supports both the first RAT and second RAT), or may be a different base station from the base station of the first RAT. The parameter may be associated with the event, the first RAT, and/or the second RAT. Identifying the value of the parameter may comprise determining, measuring, or receiving the value. A parameter associated with the event and/or the second RAT may comprise at least one of: signal quality, or quality of service (QoS) level. A parameter for signal quality may comprise at least one of: signal to noise ratio (SNR), reference signal received power (RSRP), reference signal received quality (RSRQ), received signal strength indicator (RSSI), or maximum coupling loss (MCL). The signal quality may comprise signal quality of at least one of: downlink signals, uplink signals, broadcast signals, unicast signals, unlicensed spectrum signals, contention access based signals, or satellite positioning signals. The value may be referred to as the first value, and the parameter may be referred to as the first parameter.

At 624, if coverage of the second RAT is determined to be not found, the attempt to connect to the second RAT may be considered unsuccessful. In response an unsuccessful connection to the second RAT, the UE may monitor for or keep monitoring for the first RAT or the second RAT (628). If the UE finds coverage of only the first RAT or only the second RAT, the UE may attempt to connect to the RAT for which coverage is found. If the UE finds coverage of both the first RAT and the second RAT, the UE may attempt to connect to the first RAT or the second RAT, based on application needs, battery status, a pre-determined ordering of RATs, or other criteria. UE components for performing activities associated with 624, 626, and/or 628 may include antenna 352, receiver/transmitter 354, receiver processor 356, channel estimator 358, transmit processor 368, and/or controller/processor 359.

At 630, the UE may identify improvement of the second RAT's signal. The identified improvement may be based on a second value. For example, the second value may comprise a value of a second parameter associated with the event, the first RAT, and/or the second RAT. The second value may be identified by the UE in response to stopping the attempt to communicate with the BS of the first RAT and before the attempting to connect to the second RAT. The second parameter may be the same as the first parameter or different from the first parameter. The UE may store the second value. The UE may compare the second value to the first value. For example, the comparing may comprise adjusting the first value or the second value based at least in part on a relation factor/relation quotient before the comparing. The relation factor/relation quotient may represent how a service drop/improvement of the first RAT translates to drop/improvement of the second RAT using the factor/quotient as a multiplier, scaling factor, weight, mapping, etc. The relation factor/relation quotient may be 1:1 but it may vary by a difference/delta. For example, if the first RAT supports Cat M1 and the second RAT supports NB-IoT, and if the Cat M1 RAT and the NB-IoT RAT experience different conditions (e.g., signal conditions, environmental conditions), a change in signal strength for Cat M1 by, for example, 5 dB may have an impact of 5+/− Delta dB for NB-IoT. The improvement may be a delta/difference between the second value and the first value, based on the comparing.

The UE may determine whether to perform an action associated with the first RAT based at least in part on a comparison, for example, between the first value and another value, or between a threshold value and a value that represents an improvement of the first value, etc. The action associated with the first RAT may comprise at least one of: scanning for the first RAT, connecting to a BS of the first RAT, or transitioning from the second RAT to the first RAT. Determining whether to perform the action associated with the first RAT, based at least in part on the comparison, may comprise at least one of: determining not to perform the action if the first value is at or below the second value, or determining to perform the action if the value is above the second value. Determining to perform the action if the first value is above the second value may comprise determining to perform the action if the value remains above the second value for a threshold of time. Determining to perform the action if the first value is above the second value may comprise: comparing the first value to a third value that is above the second value, and determining to perform the action if the value is above the third value. According an aspect of the present disclosure, at 632, a comparison may be made between the identified improvement and a threshold (referred to as "T" in the figure). For example, if the identified improvement is greater than the threshold, the UE may perform one or more actions associated with the first RAT, e.g., scan for the first RAT (634). UE components for performing activities associated with 630, 632, and/or 634 may include antenna 352, receiver/transmitter 354, receiver processor 356, channel estimator 358, transmit processor 368, and/or controller/processor 359. If the UE is in the coverage of the first RAT, it may attempt to communicate with a base station of the first RAT in order to connect to the base station and camp onto the first RAT (620). If the identified improvement is less than or equal to the threshold, the UE may continue to identify improvement of the second RAT's signal (630).

According an aspect of the present disclosure, determining whether to perform the action associated with the first RAT may be further based on a status of the UE. The status of the UE may comprise at least one of: battery level status, access to power source status, application requirements, transmission or reception requirements, or a condition of environment around the UE. According to an aspect of the present disclosure, in addition to the conditions mentioned herein that may impact signal strength of RATs, the techniques of this disclosure may be applicable to any other condition that may impact the signal strength of RATs, including future RATs.

Figure 7:
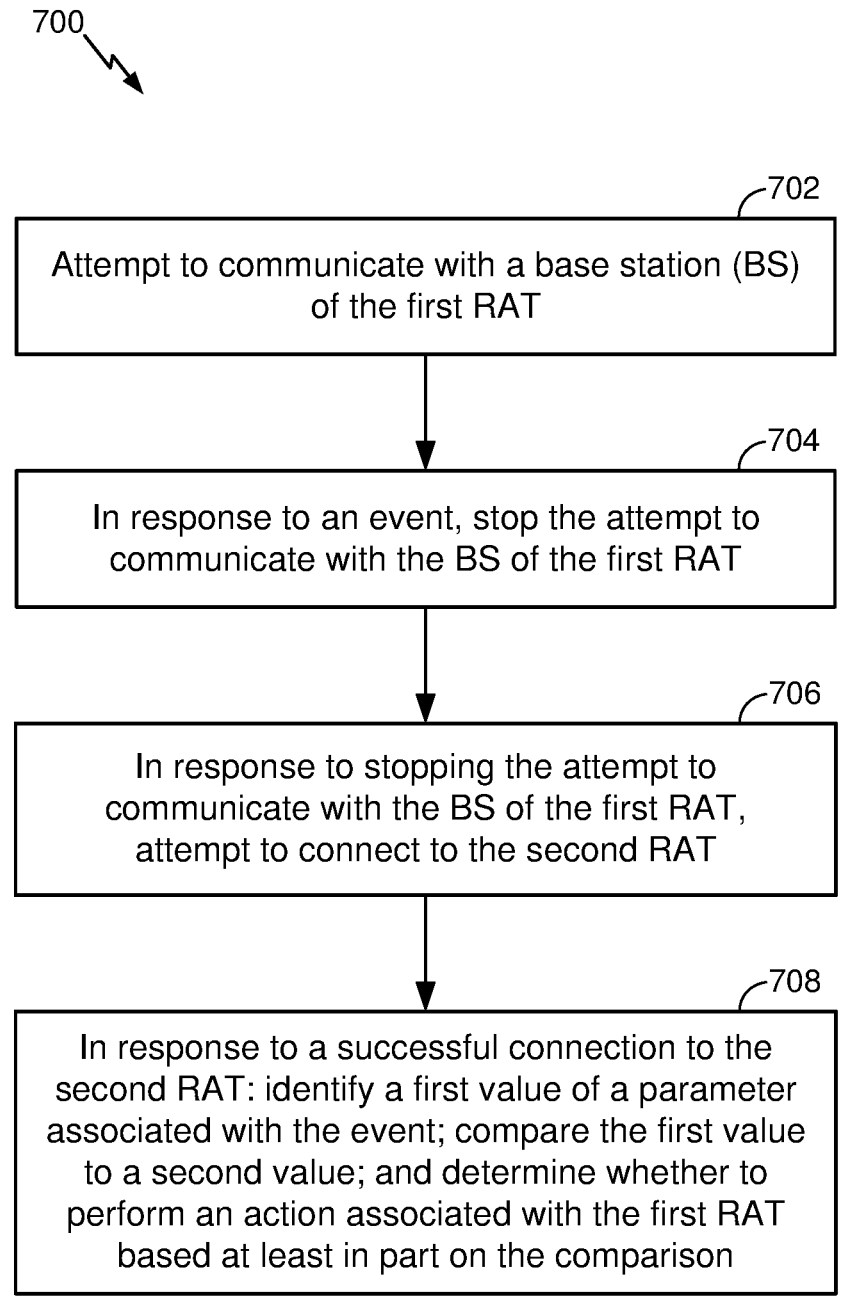
FIG. 7 illustrates example operations, e.g., by a UE, in accordance with certain aspects of the present disclosure.

FIG. 7 illustrates example operations 700, e.g., by a UE (e.g., UE 104, 350), for wireless communications, in accordance with certain aspects of the present disclosure. The UE may comprise an Internet-of-Things (IoT) UE. The UE may support multiple RATs, such as a first RAT and a second RAT. The second RAT may provide deeper coverage support than the first RAT. The first RAT, for example, may be an eMTC RAT, and the second RAT, for example, may be a NB-IoT RAT. The UE may attempt to communicate with a base station (BS) of the first RAT (702). UE components for performing operation 702 may include antenna 352, receiver/transmitter 354, receiver processor 356, channel estimator 358, transmit processor 368, and/or controller/processor 359. In response to an event, the UE may stop the attempt to communicate with the BS of the first RAT (704).

UE components for performing operation 704 may include antenna 352, receiver/transmitter 354, receiver processor 356, channel estimator 358, transmit processor 368, and/or controller/processor 359. In response to stopping the attempt to communicate with the BS of the first RAT, the UE may attempt to connect to the second RAT (706). UE components for performing operation 706 may include antenna 352, receiver/transmitter 354, receiver processor 356, channel estimator 358, transmit processor 368, and/or controller/processor 359. In response to a successful connection to the second RAT, the UE may identify a value of a parameter associated with the event (the value may be referred to as a first value), compare the value to a second value, and determine whether to perform an action associated with the first RAT based at least in part on the comparison (708). UE components for performing operation 708 may include antenna 352, receiver/transmitter 354, receiver processor 356, channel estimator 358, transmit processor 368, and/or controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. The word "exemplary" is used herein to mean "serving as an example, instance, or illustration." Any aspect described herein as "exemplary" is not necessarily to be construed as preferred or advantageous over other aspects. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.). As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps, techniques, mechanisms, methodologies, and/or actions may be interchanged with one another, and/or work together with each other, without departing from the scope of the claims. In other words, unless a specific order or combination of steps, techniques, mechanisms, methodologies, and/or actions is specified, the order, combination, and/or use of specific steps, techniques, mechanisms, methodologies, and/or actions may be modified without departing from the scope of the claims.

The various operations, flows, processes, and/or activities described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations, flows, processes, and/or activities illustrated in Figures, they may be performed by any suitable corresponding counterpart means-plus-function components. The aforementioned means may include one or more of the aforementioned components of the UE 350 and/or BS 310 configured to perform the functions recited by the means. A processing system for a UE may include TX Processor 368, RX Processor 356, and the controller/processor 359. As such, in one configuration, the means may include TX Processor 368, RX Processor 356, and/or controller/processor 359 configured to perform the functions recited by the means. TX Processor 368, RX Processor 356, and/or the controller/processor 359 may be part of a modem processor of the UE, or part of an application processor of the UE, or part of both the modem processor and the application processor of the UE. The modem processor and the application processor may be separate hardware components, or may be integrated together on the same hardware component as, e.g., a system on a chip (SoC).

For example, means for attempting, means for stopping, means for identifying, means for comparing, means for determining, means for scanning, means for adjusting, means for connecting, means for entering, means for supporting, means for performing, means for initiating, means for completing, means for communicating, means for scrambling, means for assigning, means for occupying, means for defining, means for targeting, means for configuring, means for processing, means for indicating, means for measuring, means for estimating, means for enabling, means for selecting, means for transmitting, means for receiving, means for sending, means for mapping, means for synchronizing, means for prioritizing, means for allocating, means for rejecting, means for restricting, means for increasing, and/or means for decreasing may include one or more processors/controllers, transmitters, receivers, antennas, and/or other modules, components, or elements of, for example, user equipment 104, 350, base station 102/180, 310, and/or another network entity. The words "module," "mechanism," "component," "element," "device," and the like may not be a substitute for the word "means." As such, no claim element is to be construed as a means plus function unless the element is expressly recited using the phrase "means for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

As used herein, the terms "identify" or "determine", and their other forms such as "identifying", "identified", "identification", "determining", "determination", etc., encompass a wide variety of actions. For example, "identifying" or "determining" may include measuring, receiving, sensing, monitoring, selecting, calculating, computing, processing, deriving, investigating, identifying, determining, indicating, detecting, looking up (e.g., looking up in a table, a database or another data structure), ascertaining, storing, characterizing, capturing, and the like. Also, "identifying" or "determining" may include receiving (e.g., receiving information), accessing (e.g., accessing data in a memory) and the like. Also, "identifying" or "determining" may include resolving, selecting, choosing, establishing and the like.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE) that supports a first type of radio access technology (RAT) and a second type of RAT, comprising:
   attempting to communicate with a base station (BS) of the first RAT;
   in response to an event, stopping the attempt to communicate with the BS of the first RAT;
   in response to stopping the attempt to communicate with the BS of the first RAT, attempting to connect to the second RAT; and
   in response to a successful connection to the second RAT:
      identifying a first value of a parameter associated with the event;
      comparing the first value to a second value; and
      determining whether to perform an action associated with the first RAT based at least in part on the comparing; wherein the second type of RAT supports deeper coverage than the first type of RAT.

2. The method of claim 1, wherein the attempting to communicate with the BS of the first RAT comprises: attempting to connect to the BS of the first RAT, or attempting to communicate with the BS of the first RAT while in a connected mode.

3. The method of claim 1, wherein the attempting to connect to the second RAT comprises scanning for the second RAT and entering a connected mode with the second RAT.

4. The method of claim 1, wherein the event comprises an indication that the base station of the first RAT is out of service (OOS) or in a congested state.

5. The method of claim 4, wherein the OOS indication or the congested state indication is based on detection of at least one of: a radio link failure (RLF), a physical layer out-of-sync, a failure of a random access channel (RACH) procedure, a maximum number of radio link control (RLC) retransmission attempts, an invalid radio resource control (RRC) configuration, a security failure, a handover failure, a failure to decode a system information block (SIB), a failed connection attempt, a timer expiration, or a drop in service level.

6. The method of claim 1, wherein the parameter associated with the event comprises at least one parameter for: signal quality, or quality of service (QoS) level.

7. The method of claim 1, further comprising: in response to an unsuccessful connection to the second RAT, monitoring for the first RAT or the second RAT.

8. The method of claim 1, wherein the second value comprises a value of a second parameter associated with the event, identified by the UE in response to stopping the attempt to communicate with the BS of the first RAT and before the attempting to connect to the second RAT, the second parameter being the same as or different from the parameter associated with the event.

9. The method of claim 8, wherein the comparing the value to the second value comprises adjusting the value or the second value based at least in part on a relation factor before comparing.

10. The method of claim 1, wherein the action associated with the first RAT comprises at least one of: scanning for the first RAT, connecting to a BS of the first RAT, or transitioning from the second RAT to the first RAT.

11. The method of claim 1, wherein determining whether to perform the action associated with the first RAT, based at least in part on the comparing, comprises at least one of: determining not to perform the action if the first value is at or below the second value, or determining to perform the action if the value is above the second value.

12. The method of claim 11, wherein determining to perform the action if the value is above the second value comprises determining to perform the action if the value remains above the second value for a threshold of time.

13. The method of claim 11, wherein determining to perform the action if the value is above the second value comprises: comparing the value to a third value that is above the second value, and determining to perform the action if the value is above the third value.

14. The method of claim 1, wherein determining whether to perform the action associated with the first RAT is further based on a status of the UE.

15. An apparatus, for wireless communication, that supports a first type of radio access technology (RAT) and a second type of RAT, comprising:
   at least one processor; and
   memory coupled with the at least one processor, the memory comprising instructions executable by the at least one processor to cause the apparatus to:
      attempt to communicate with a base station (BS) of the first RAT;
      in response to an event, stop the attempt to communicate with the BS of the first RAT;
      in response to stopping the attempt to communicate with the BS of the first RAT, attempt to connect to the second RAT; and
      in response to a successful connection to the second RAT:
         identify a first value of a parameter associated with the event;
         compare the first value to a second value; and
         determine whether to perform an action associated with the first RAT based at least in part on the comparison; wherein the second type of RAT supports deeper coverage than the first type of RAT.

16. The apparatus of claim 15, wherein the attempt to communicate with the BS of the first RAT comprises: attempt to connect to the BS of the first RAT, or attempt to communicate with the BS of the first RAT while in a connected mode.

17. The apparatus of claim 15, wherein the attempt to connect to the second RAT comprises: scan for the second RAT and enter a connected mode with the second RAT.

18. The apparatus of claim 15, wherein the event comprises an indication that the base station of the first RAT is out of service (OOS) or in a congested state.

19. The apparatus of claim 18, wherein the OOS indication or the congested state indication is based on detection of at least one of: a radio link failure (RLF), a physical layer out-of-sync, a failure of a random access channel (RACH) procedure, a maximum number of radio link control (RLC) retransmission attempts, an invalid radio resource control (RRC) configuration, a security failure, a handover failure, a failure to decode a system information block (SIB), a failed connection attempt, a timer expiration, or a drop in service level.

20. The apparatus of claim 15, wherein the parameter associated with the event comprises at least one parameter for: signal quality, or quality of service (QoS) level.

21. The apparatus of claim 15, the memory further comprising instructions executable by the at least one processor to cause the apparatus to: in response to an unsuccessful connection to the second RAT, monitor for the first RAT or the second RAT.

22. The apparatus of claim 15, wherein the second value comprises a value of a second parameter associated with the event, identified by the apparatus in response to the stop of the attempt to communicate with the BS of the first RAT and before the attempt to connect to the second RAT, the second parameter being the same as or different from the parameter associated with the event.

23. The apparatus of claim 22, wherein the comparison of the value to the second value comprises: adjust the value or the second value based at least in part on a relation factor before comparing.

24. The apparatus of claim 15, wherein the action associated with the first RAT comprises at least one of: scan for the first RAT, connect to a BS of the first RAT, or transition from the second RAT to the first RAT.

25. The apparatus of claim 15, wherein the determination of whether to perform the action associated with the first RAT, based at least in part on the comparison, comprises at least one of: determine not to perform the action if the first value is at or below the second value, or determine to perform the action if the value is above the second value.

26. The apparatus of claim 25, wherein the determination to perform the action if the value is above the second value comprises: determine to perform the action if the value remains above the second value for a threshold of time.

27. The apparatus of claim 25, wherein the determination to perform the action if the value is above the second value comprises: compare the value to a third value that is above the second value, and determine to perform the action if the value is above the third value.

28. The apparatus of claim 15, wherein the determination of whether to perform the action associated with the first RAT is further based on a status of the apparatus.

29. An apparatus, for wireless communication, that supports a first type of radio access technology (RAT) and a second type of RAT, comprising:
   means for attempting to communicate with a base station (BS) of the first RAT;
   means for, in response to an event, stopping the attempt to communicate with the BS of the first RAT;
   means for, in response to stopping the attempt to communicate with the BS of the first RAT, attempting to connect to the second RAT; and
   means for, in response to a successful connection to the second RAT:
      identifying a first value of a parameter associated with the event;
      comparing the first value to a second value; and
      determining whether to perform an action associated with the first RAT based at least in part on the comparing; wherein the second type of RAT supports deeper coverage than the first type of RAT.

30. A non-transitory computer-readable medium for wireless communication by a user equipment (UE) that supports a first type of radio access technology (RAT) and a second type of RAT, the non-transitory computer-readable medium comprising code, which when executed by at least one processor, causes the UE to:
   attempt to communicate with a base station (BS) of the first RAT;
   in response to an event, stop the attempt to communicate with the BS of the first RAT;

in response to stopping the attempt to communicate with the BS of the first RAT, attempt to connect to the second RAT; and in response to a successful connection to the second RAT:
  identify a first value of a parameter associated with the event;
  compare the first value to a second value; and
  determine whether to perform an action associated with the first RAT based at least in part on the comparison;
    wherein the second type of RAT supports deeper coverage than the first type of RAT.

* * * * *